United States Patent
Ueno

(10) Patent No.: US 10,536,451 B2
(45) Date of Patent: Jan. 14, 2020

(54) AUTHENTICATION APPARATUS AND AUTHENTICATION PROGRAM

(71) Applicant: SEIKO EPSON CORPORATION, Tokyo (JP)

(72) Inventor: Kikuo Ueno, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 205 days.

(21) Appl. No.: 15/868,400

(22) Filed: Jan. 11, 2018

(65) Prior Publication Data

US 2018/0219853 A1    Aug. 2, 2018

(30) Foreign Application Priority Data

Jan. 30, 2017 (JP) ................. 2017-013925

(51) Int. Cl.
  *H04L 29/06* (2006.01)
(52) U.S. Cl.
  CPC .................. *H04L 63/083* (2013.01)
(58) Field of Classification Search
  CPC .................. H04L 63/083; G06F 21/62
  See application file for complete search history.

(56) References Cited

U.S. PATENT DOCUMENTS

| | | | | |
|---|---|---|---|---|
| 8,832,804 | B1* | 9/2014 | Casey | G06F 21/31 704/273 |
| 9,396,322 | B2* | 7/2016 | Chougle | H04L 63/123 |
| 9,400,883 | B2* | 7/2016 | Chougle | H04L 63/123 |
| 9,613,206 | B2* | 4/2017 | Chougle | H04L 63/123 |
| 9,710,367 | B1* | 7/2017 | Nagineni | G06F 11/3684 |
| 2014/0157390 | A1* | 6/2014 | Lurey | G06F 21/123 726/7 |
| 2015/0254452 | A1* | 9/2015 | Kohlenberg | H04L 63/083 726/6 |
| 2016/0173481 | A1* | 6/2016 | Kwon | H04L 63/083 726/6 |
| 2018/0248698 | A1* | 8/2018 | Kominar | G06F 21/31 |
| 2019/0020773 | A1* | 1/2019 | Hosoda | G06F 21/31 |

FOREIGN PATENT DOCUMENTS

| | | | | | |
|---|---|---|---|---|---|
| JP | 2000-10773 | A | * | 1/2000 | G06F 9/06 |
| JP | 2012-194826 | A | * | 10/2012 | G06F 1/00 |
| JP | 2016-005097 | A | | 1/2016 | |

* cited by examiner

*Primary Examiner* — Christopher A Revak
(74) *Attorney, Agent, or Firm* — Workman Nydegger

(57) ABSTRACT

An authentication apparatus in a multifunction peripheral is configured to display, in a screen, an account field and a password field so as to allow an input, inhibit an input in the account field before an input is made in the password field, mask a letter inputted in the password field, and restrict a letter string including a same letter that has been inputted in the password field, from being inputted in the account field.

6 Claims, 3 Drawing Sheets

AUTHENTICATION APPARATUS AND AUTHENTICATION PROGRAM

CROSS-REFERENCE TO RELATED APPLICATIONS

The present application claims priority to Japanese Patent Application No. 2017-013925, filed Jan. 30, 2017, which is hereby incorporated by reference in its entirety.

BACKGROUND

1. Technical Field

The present invention relates to an authentication apparatus that receives an input of an account and a password, and an authentication program.

2. Related Art

JP-A-2016-5097 discloses an image storage system designed for storing image data shot and edited by a shooting and editing apparatus, in an image management server through a network. According to this Literature, the user who utilizes the image storage system registers authentication information including his/her account and password in the image management server, in advance. When the user wishes to review the image data stored in the image management server, the user transmits the authentication information from the shooting and editing apparatus to the image management server. When the authentication based on the authentication information is successfully obtained from the image management server, the user is permitted to access the image data in the image management server.

An authentication apparatus for obtaining the permission (authentication) from an authentication server, such as the image management server according to JP-A-2016-5097 is normally configured to display an account field and a password field in the screen, and stand by for an input of the account and the password. When the password is inputted in the password field, the authentication apparatus masks each of the letters being inputted, so prevent the password from being stolen by a third person. In contrast, the authentication apparatus displays the letters inputted in the account field without masking, so as to allow the user to confirm the letter string (account) inputted in the account field.

Now, in case that the user has inputted the password by mistake in the account field, the inputted password is displayed, without being masked. Therefore, a third person, who has had the chance to sneak a look at the password inputted in the account field, can acquire the password. Such a case may occur in various situations where a user inputs the account and the password.

SUMMARY

An advantage of some aspects of the invention is to provide an authentication apparatus, and an authentication program, that prevent a password from being displayed in an account field.

In an aspect, the invention provides an authentication apparatus including a display unit that displays, in a screen, an account field and a password field so as to allow an input, an inhibition unit that inhibits an input in the account field before an input is made in the password field, a masking unit that masks a letter inputted in the password field, and a restriction unit that restricts a letter string including a same letter that has been inputted in the password field, from being inputted in the account field.

The foregoing authentication apparatus inhibits inputting in the account field, before the password field is filled in. Accordingly, the password can be prevented from being inputted in the account field, thus to be displayed. In addition, the authentication apparatus restricts the letter string, including the same letter that has been inputted in the password field, from being inputted in the account field. Therefore, even though the user inputs the password by mistake in the account field after filling in the password field, the password is prevented from being displayed in the account field.

In the mentioned authentication apparatus, it is preferable that the restriction unit inhibits a same letter as a first letter in the password field from being inputted in the account field, as a first letter. To be more detailed, it is preferable to inhibit, in the registration procedure of the authentication information in the authentication server, the registration of the authentication information in which the first letter of the account and the first letter of the password are the same, to thereby inhibit the same letter as the first letter in the password field from being inputted in the account field, as the first letter. Such an arrangement prevents the user from inputting the password by mistake in the account field.

In the mentioned authentication apparatus, it is preferable that the restriction unit inhibits, when the same letter as the first letter in the password field is inputted in the account field as the first letter, an input of an additional letter in the account field, for a predetermined time. In this case, the second and subsequent letters of the password can be prevented from being displayed in the account field, even when the user attempts to successively input the letters of the password in the account field.

In the mentioned authentication apparatus, the restriction unit may display the letter in the account field with a mask, when the same letter as the first letter in the password field is inputted in the account field as the first letter. In this case, even though the user inputs the password by mistake in the account field, the password is prevented from being displayed in the account field.

In the mentioned authentication apparatus, the inhibition unit may inhibit an input in the account field through a keyboard before the password field is filled in, and permit an automatic input in the account field made without operating the keyboard, before the password field is filled in. In the case where, for example, the account is automatically acquired by the authentication apparatus and inputted in the account field, there is no chance that the password is inputted by mistake in the account field. In such a case, therefore, the password can be prevented from being displayed, despite permitting the automatic input in the account field, before the password field is filled in.

In another aspect, the invention provides an authentication program configured to cause a computer including a screen to perform as a display device that displays, in the screen, an account field and a password field so as to allow an input, an inhibition device that inhibits an input in the account field before an input is made in the password field, a masking device that masks a letter when the letter is inputted in the password field, and a restriction device that restricts a letter string including a same letter that has been inputted in the password field, from being inputted in the account field.

In the computer operating according to the foregoing authentication program, inputting in the account field is inhibited, before the password field displayed in the screen is filled in. Accordingly, the password can be prevented from being inputted in the account field, thus to be displayed. In addition, the letter string, including the same letter that has been inputted in the password field, is restricted from being inputted in the account field. Therefore, even though the user inputs the password by mistake in the account field after filling in the password field, the password is prevented from being displayed in the account field.

BRIEF DESCRIPTION OF THE DRAWINGS

The invention will be described with reference to the accompanying drawings, wherein like numbers reference like elements.

DESCRIPTION OF EXEMPLARY EMBODIMENT

Hereafter, a multifunction peripheral, exemplifying the authentication apparatus according to the invention will be described, with reference to the drawings.

Figure 1:
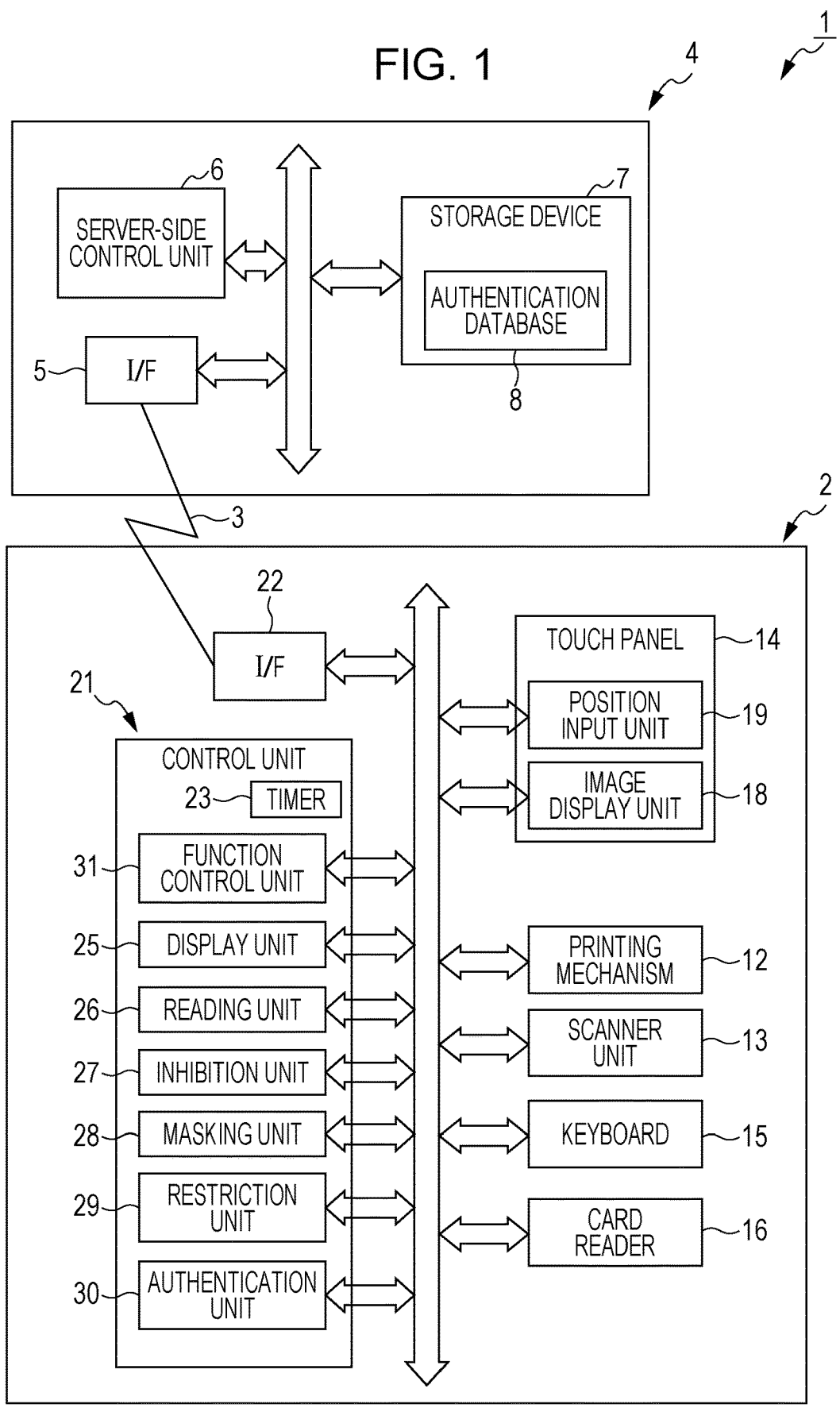
FIG. 1 is a block diagram of an authentication system according to the invention.
Figure 2:
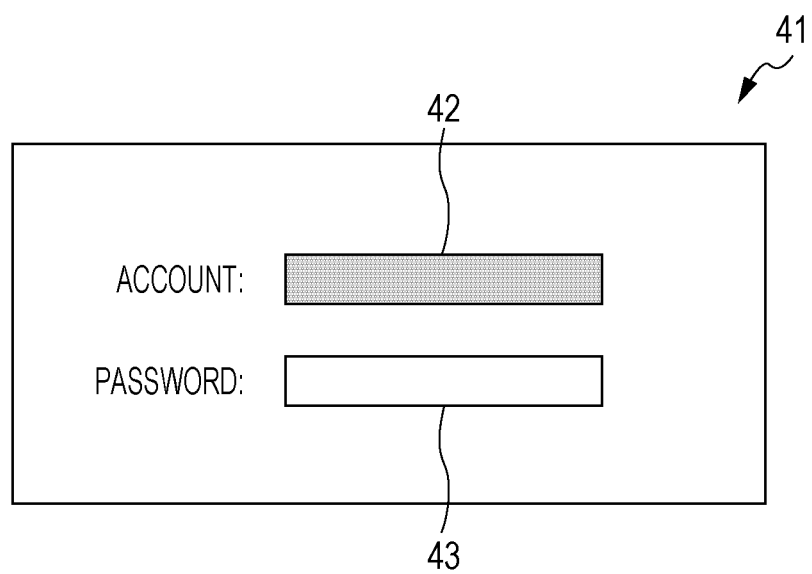
FIG. 2 is a schematic drawing for explaining an authentication screen in an initial state.
Figure 3:
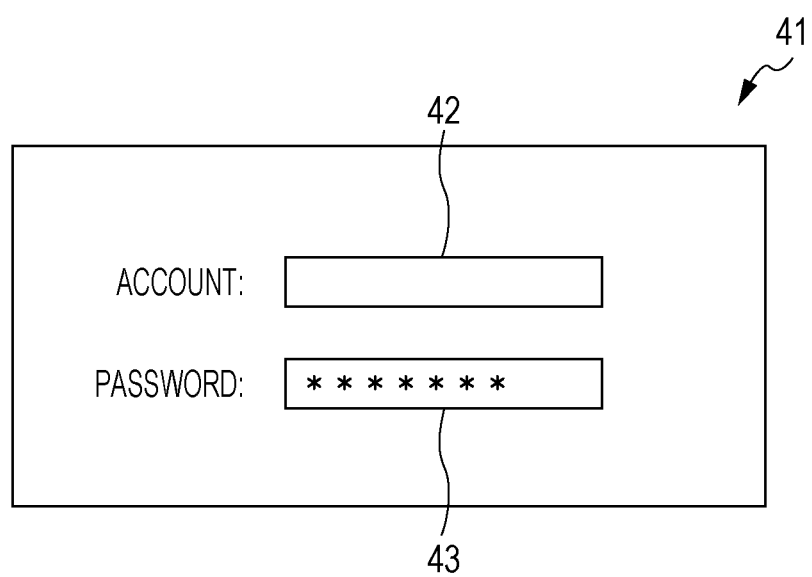
FIG. 3 is a schematic drawing for explaining the authentication screen in which a password has been inputted.

FIG. 1 is a block diagram of an authentication system including the multifunction peripheral according to the invention. FIG. 2 is a schematic drawing for explaining an authentication screen in an initial state. FIG. 3 is a schematic drawing for explaining the authentication screen in which a password has been inputted. As shown in FIG. 1, the authentication system 1 includes the multifunction peripheral 2 (authentication apparatus), and an authentication server 4 connected to the multifunction peripheral 2 via a network 3.

The authentication server 4 manages users who use the multifunction peripheral 2. The authentication server 4 includes an interface (I/F) unit 5 for performing network communication, a server-side control unit 6 including a processor (e.g., CPU, ASIC, or a combination thereof), a ROM, and a RAM, and a storage device 7 such as a HDD. The storage device 7 contains an authentication database 8. In the authentication database 8, authentication information of the users permitted to use the multifunction peripheral 2 is registered in advance. The authentication information includes an account and a password of each user. In the authentication information registered in the authentication database 8, a first letter of the account and a first letter of the password have to be different from each other. Here, the letter may include, in addition to a letter, a symbol or a numeral. In other words, when the authentication information is to be registered in the authentication database 8, the authentication information in which the first letter of the account and the first letter of the password are the same is rejected.

The server-side control unit 6 looks up the authentication database 8, according to the authentication information transmitted from the user of the multifunction peripheral 2. When the authentication information that agrees with the authentication information from the multifunction peripheral 2 is stored in the authentication database 8, the server-side control unit 6 transmits an authentication result indicating that the use of the multifunction peripheral 2 is permitted, to the multifunction peripheral 2. On the contrary, when the authentication information that agrees with the authentication information from the multifunction peripheral 2 is not stored in the authentication database 8, the server-side control unit 6 transmits an authentication result indicating that the use of the multifunction peripheral 2 is not permitted, to the multifunction peripheral 2.

The multifunction peripheral 2 (displaying apparatus) possesses a printing function and a copying function. The multifunction peripheral 2 includes a printing mechanism 12, an optical scanner unit 13, a touch panel 14, a keyboard 15, and a card reader 16. The touch panel 14 includes an image display unit 18 for displaying an operation screen, and a position input unit 19 provided on the screen of the image display unit 18. The position input unit 19 detects a position touched by the user, on the operation screen displayed in the image display unit 18. The image display unit 18 is constituted of, for example, a liquid crystal display (LCD). The position input unit 19 may include, for example, a light emitting element and a photodetector, to detect a position where light is blocked (touched position). Alternatively, a different detection method may be adopted for the touch panel 14.

The keyboard 15, which is designed for inputting numerals, marks, and alphabets, includes an enter key. The card reader 16 serves to read an ID card distributed in advance to each of the users. The ID card includes a storage region such as a magnetic stripe or an IC chip, in which the account of the user is stored. The card reader 16 acquires the account stored in the storage region.

The multifunction peripheral 2 also includes a control unit 21 that controls the printing mechanism 12 and the scanner unit 13, and an I/F unit 22 for communication with the authentication server 4 through the network 3. The control unit 21 realizes the printing function. More specifically, the control unit 21 controls the printing mechanism 12 on the basis of print job data received through the I/F unit 22, so as to execute a printing operation to print a content represented by the print job data. The control unit 21 also realizes the copying function. More specifically, the control unit 21 executes a copying operation including causing the printing mechanism 12 to print the image data generated by scanning a source document with the scanner unit 13, thereby copying the source document, according to an instruction inputted through the touch panel 14. Here, the multifunction peripheral 2 may possess additional functions. For example, the multifunction peripheral 2 may include a facsimile function to transmit the image data generated by scanning the source document with the scanner unit 13, to an address inputted through the touch panel 14.

Further, the control unit 21 executes the authentication. More specifically, the control unit 21 receives an input of the account and the password from the user, and transmits such authentication information to the authentication server 4. In addition, the control unit 21 permits the user to use the printing function or copying function, depending to the authentication result provided by the authentication server 4.

The control unit 21 includes a processor, a ROM, and a RAM. The control unit 21 also includes a timer 23. The processor may be constituted of one or more of a CPU, an ASIC, and a signal processing circuit. In this embodiment, it will be assumed that the control unit 21 includes the CPU. Here, the control unit 21 may also include a HDD for accumulating data received or acquired by scanning source documents.

The control unit 21 obtains a display unit 25, a reading unit 26, an inhibition unit 27, a masking unit 28, a restriction unit 29, and an authentication unit 30, all of which serve for the authentication, when the CPU executes an authentication program stored in the ROM. In other words, the authentication program causes the control unit 21 to act as a display device (display unit 25), a reading device (reading unit 26), an inhibition device (inhibition unit 27), a masking device (masking unit 28), a restriction device (restriction unit 29), and an authentication device (authentication unit 30). Further, when the CPU executes a function control program stored in the ROM, the control unit 21 obtains a function control unit 31 for realizing the printing function and the copying function. In other words, the function control program causes the control unit 21 to act as a function control device (function control unit 31).

The display unit 25 displays an authentication screen 41 in the image display unit 18, and receives the input of the authentication information. To be more detailed, the display unit 25 displays an account field 42 and a password field 43 in the authentication screen 41, so as to receive an input in these fields 42 and 43. As shown in FIG. 2, in an initial state immediately after the authentication screen 41 is displayed, the display unit 25 blots out the inside of the account field 42, for example with a gray color, and locates the cursor in the password field 43. When the user finishes the input in the password field 43 and presses the enter key of the keyboard 15, the display unit 25 moves the cursor to the account field 42, and brightens the account field 42.

When the user causes the card reader 16 to read his/her ID card, the reading unit 26 acquires the account of the user, from the storage region of the ID card. The reading unit 26 also automatically inputs the user's account acquired, in the account field 42.

The inhibition unit 27 inhibits the input of a letter in the account field 42 through the keyboard 15, before the password field 43 is filled in. More specifically, when the display unit 25 displays the authentication screen 41, the inhibition unit 27 starts to monitor whether the password has been inputted in the password field 43, and inhibits an input in the account field 42 until the password field 43 is filled in. Here, the inhibition unit 27 permits the automatic input in the account field 42, made without operating the keyboard 15, before the password field 43 is filled in. Thus, in the case where the account acquired by the reading unit 26 is automatically inputted in the account field 42, the inhibition unit 27 permits such automatic input.

When letters are inputted in the password field 43, the masking unit 28 masks each of the letters. More specifically, the masking unit 28 does not display the letters inputted in the password field 43 as they are, but replaces each of the letters with for example an asterisk letter, as show in FIG. 3.

The restriction unit 29 restricts the same letter string from being inputted in both of the account field 42 and the password field 43. In addition, the restriction unit 29 monitors the letter inputted in the account field 42, and inhibits the same letter as the first letter in the password field 43 from being inputted in the account field 42, as the first letter. Here, in the authentication system according to this embodiment, it is the condition for the registration of the authentication information in the authentication database 8, that the first letter of the account and the first letter of the password are different from each other. Therefore, the mentioned restriction applied by the restriction unit 29 to the input of the account and the password does not constitute any disturbance to the authentication process.

Further, the restriction unit 29 inhibits the input of a letter in the account field 42 for a predetermined time (e.g., five seconds), when the letter inputted in the account field 42 as the first letter is the same as the first letter in the password field 43. In other words, the restriction unit 29 starts the timer 23, when the letter inputted in the account field 42 as the first letter is the same as the first letter in the password field 43. Then the restriction unit 29 inhibits the input of a letter in the account field 42, until the time measured by the timer 23 reaches the predetermined time.

When the input of the password in the password field 43 and the input of the account in the account field 42 are both finished, the authentication unit 30 transmits the account and the password inputted in the respective fields to the authentication server 4, as the authentication information. Then, in the case where the authentication result received by the multifunction peripheral 2 from the authentication server 4 indicates that the user is permitted to use the multifunction peripheral 2, in other words when the authentication is successfully obtained, the authentication unit 30 transmits an operation start instruction, to the function control unit 31. In contrast, in the case where the authentication result from the authentication server 4 indicates that the use of the multifunction peripheral 2 by the user is rejected, in other words when the authentication has failed, the authentication unit 30 displays an error message in the authentication screen 41 to the effect that the authentication has failed, and maintains the display of the authentication screen 41 in the touch panel 14.

The function control unit 31 displays, upon receipt of the operation start instruction from the authentication unit 30, the operation screen in the image display unit 18. The operation screen includes, though not shown, a plurality of buttons that are graphical user interface (GUI) components. The printing operation, the copying operation, and so forth are assigned to the respective buttons, in advance. When the user touches one of the buttons, the printing mechanism 12 or scanner unit 13 is activated, and the printing operation or copying operation corresponding to the touched button is executed.

Authentication Process

Figure 4:
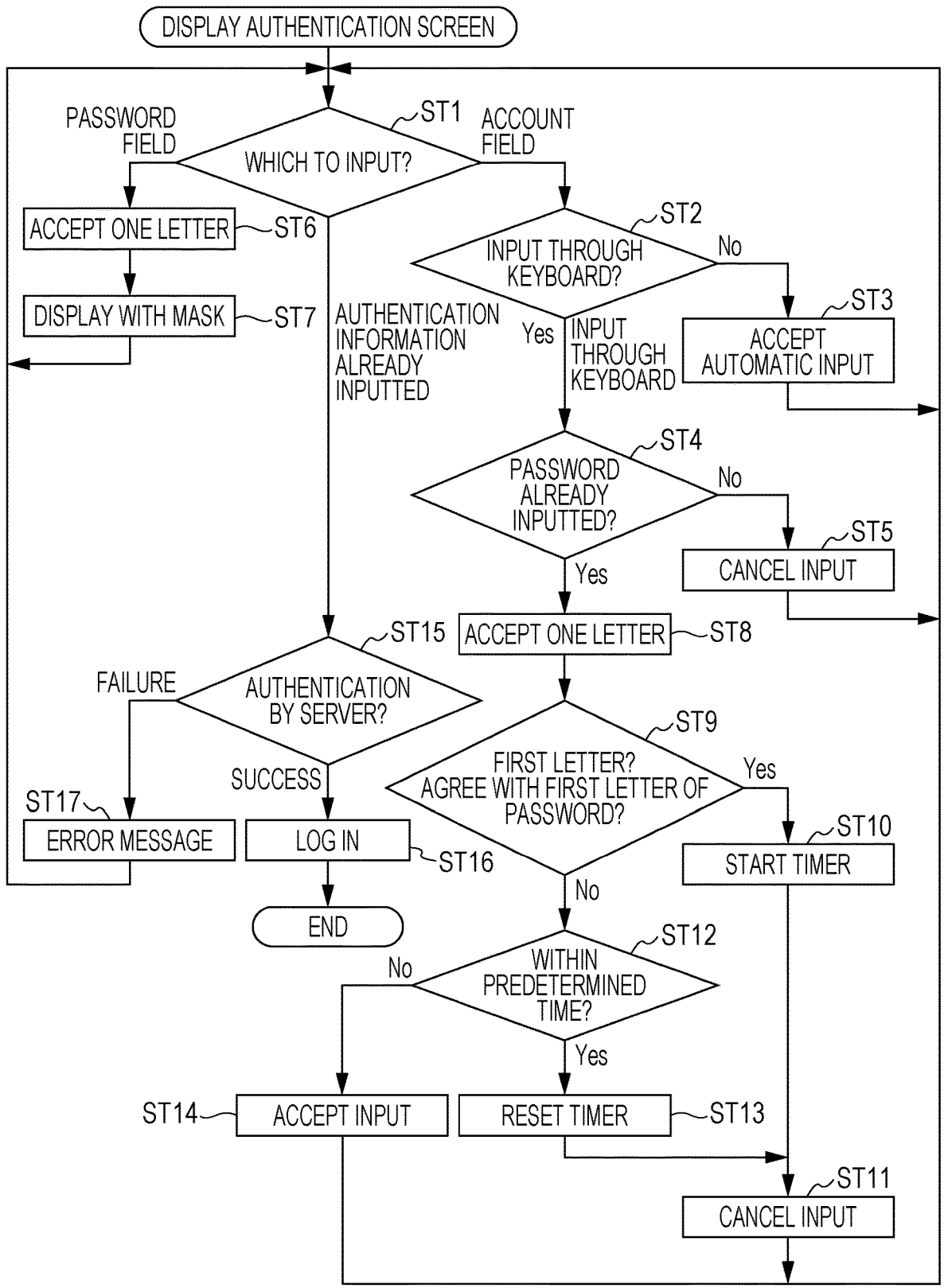
FIG. 4 is a flowchart showing an authentication process.

Referring now to FIG. 2 to FIG. 4, the authentication process performed in the authentication system 1 will be described. FIG. 4 is a flowchart showing the authentication process performed by the multifunction peripheral 2. First, when the power to the multifunction peripheral 2 is turned on, the authentication screen 41 shown in FIG. 2 is displayed in the touch panel 14. In the authentication screen 41, the account field 42 and the password field 43 are located at an upper and a lower position. The cursor is located in the password field 43.

When the user causes the card reader 16 to read the ID card, the reading unit 26 acquires the account from the ID card, and inputs the acquired account in the account field 42. Thus, the automatic input of the account is performed without operating the keyboard 15 (ACCOUNT FIELD at step ST1, No at step ST2, and step ST3). Then the display unit 25 is set to a standby mode for the input of the password (step ST1). In contrast, when the user moves the cursor to the account field 42 and attempts to input letters in the account field 42 (step ST1, and Yes at step ST2), the inhibition unit 27 decides whether the password has been inputted in the password field 43 (step ST4). In the case where the password has not been inputted, the inhibition unit 27 inhibits the input in the account field 42. In other words, the inhibition unit 27 cancels the input in the account field 42 (No at step ST4, and step ST5). Then the display unit 25 returns to the standby mode for the input in the password field 43 (step ST1).

Now, when a letter is inputted in the password field 43 (PASSWORD FIELD at step ST1), the display unit 25 accepts the input of the letter (step ST6). The masking unit 28 masks the inputted letter, as shown in FIG. 3 (step ST7). Then, the display unit 25 stands by for the input of the next letter of the password (step ST1). Thereafter, the operations of step ST1, step ST6, and step ST7 are repeated, until all of the letters of the password are inputted. In other words, the operations of step ST1, step ST6, and step ST7 are repeated, until the user presses the enter key of the keyboard 15, or moves the cursor to the account field 42.

When all of the letters of the password are inputted in the password field 43, the cursor moves to the account field 42. When the user then inputs a letter in the account field 42 through the keyboard 15 (ACCOUNT FIELD at step ST1, and Yes at step ST2), the inhibition unit 27 decides whether the password has already been inputted (step ST4). In the case where the password has been inputted (Yes at step ST4), the inhibition unit 27 permits the input of the letter in the account field 42. Thus, the display unit 25 accepts the input of the letter in the account field 42 (step ST8).

When the letter inputted in the account field 42 as the first letter is the same as the first letter in the password field 43 (Yes at step ST9), the restriction unit 29 starts the timer 23 (step ST10). In addition, when the same letter as the first letter in the password field 43 is inputted in the account field 42 as the first letter, it can be presumed that the user is inputting the password in the account field 42 through the keyboard 15. Therefore, the restriction unit 29 cancels the input of such a letter (step ST11). Then the display unit 25 stands by for the input of a letter in the account field 42 (step ST1).

At this point, in the case where the user has successively inputted, by mistake, the second and subsequent letters of the password in the account field 42 (ACCOUNT FIELD at step ST1, Yes at step ST2, Yes at step ST4, step ST8, and No at step ST9), the letters have been inputted before the predetermined time elapses after the timer 23 is started (Yes at step ST12). Accordingly, the restriction unit 29 cancels the input of the letters made within the predetermined time after the start of the timer 23 (step ST11). Here, the restriction unit 29 resets the timer 23 before cancelling the input of the letters (step ST13). In the case where, at step ST12, a time equal to or longer than the predetermined time has elapsed after the timer 23 is started or reset (No at step ST12), display unit 25 accepts the letter inputted in the account field 42 (step ST14).

In the case where a letter different from the first letter in the password field 43 is inputted in the account field 42 (No at step ST9), the timer 23 is not started (No at step ST12), and the display unit 25 accepts the input of such a letter (step ST14).

Thereafter, the operations of step ST1, step ST2, step ST4, step ST8, step ST9, step ST12, and step ST14 are repeated, until all of the letters of the account are inputted in the account field 42. Here, whether the input in the account field 42 has been completed is decided whether the user has pressed the enter key, or whether the number of inputted letters has reached a predetermined number of letters. Since the letter string inputted in the account field 42 is not masked, the user can visually confirm the inputted account.

When the password and the account have been respectively inputted in the password field 43 and the account field 42, the authentication unit 30 transmits the account and the password inputted in the respective fields 42 and 43 to the authentication server 4, as the authentication information (step ST15). In the case where the authentication result provided by the authentication server 4 indicates that the user is permitted to use the multifunction peripheral 2 (SUCCESS at step ST15), the authentication unit 30 permits the user to log-in in the multifunction peripheral 2. In other words, the authentication unit 30 transmits the operation start instruction to the function control unit 31 (step ST16). On the other hand, in the case where the authentication result provided by the authentication server 4 indicates that the use of the multifunction peripheral 2 by the user is rejected (FAILURE at step ST15), the authentication unit 30 displays the error message in the authentication screen 41, and maintains the display of the authentication screen 41 in the touch panel 14 (step ST17). The display unit 25 returns to the standby mode for the input in the password field 43 and the account field 42 (step ST1). Here, it is to be noted that the communication with the authentication server 4 is performed in an encrypted format.

Advantageous Effects

According to this embodiment, inputting in the account field 42 before inputting in the password field 43 is inhibited. Accordingly, the password can be prevented from being inputted in the account field 42, thus to be displayed. In addition, the letter string of the same letters as those inputted in the password field 43 is restricted from being inputted in the account field 42, and therefore, even though the user attempts to input the password by mistake in the account field 42, after inputting the password in the password field 43, the password is prevented from being displayed in the account field 42.

In the registration procedure of the authentication information in the authentication server 4 according to this embodiment, the registration of the authentication information in which the first letter of the account and the first letter of the password are the same is rejected, so that the same letter as the first letter in the password field 43 is inhibited from being inputted in the account field 42 as the first letter. Accordingly, the user can be prevented from inputting the password by mistake in the account field 42.

Further, when the letter inputted first in the account field 42 is the same as the first letter in the password field 43, the input of an additional letter in the account field 42 is inhibited for a predetermined time, and therefore the second and subsequent letters of the password can be prevented from being displayed in the account field 42, even when the user attempts to successively input the letters of the password in the account field 42.

Further, the inhibition unit 27 inhibits the input in the account field 42 through the keyboard 15 before the password field 43 is filled in, and permits the automatic input in the account field 42 made without operating the keyboard 15, before the password field 43 is filled in. Accordingly, in the case where the account is acquired by the card reader 16 and automatically inputted in the account field 42, there is no chance that the password is inputted by mistake in the account field 42. Therefore, the password can be prevented from being displayed, despite permitting the automatic input in the account field 42, before the password field 43 is filled in.

Variations

The restriction unit 29 may be configured to display the letter with the mask in the account field 42, when the same letter as the first letter in the password field 43 is inputted in the account field 42, as the first letter. In this case, the password can be prevented from being displayed in the account field 42, even though the user has inputted the password by mistake in the account field 42.

The display unit 25 may display a software keyboard in the touch panel. Although in this case the user is enabled to make inputs in the account field 42 and the password field 43 through the software keyboard, the input of letters through the software keyboard is, as in the case of the input through the physical keyboard 15, restricted by the inhibition unit 27 and the restriction unit 29.

Although the invention is applied to the multifunction peripheral 2 in the foregoing embodiment, the invention is broadly applicable to various apparatuses configured to accept the input of the account and the password, through an authentication screen such as the touch panel 14. For example, the invention is applicable to a single-function printer having only the printing function, or a single-function scanner having only the scanning function, configured to display the authentication screen on the touch panel 14. Further, the invention is applicable to a computer device or a tablet terminal configured to accept the input of the account and the password through the authentication screen, and perform the authentication in itself. In addition, it is not mandatory that the authentication screen is displayed in the touch panel 14, and a mouse or a touch pad may be employed to make inputs in the authentication screen displayed on a display unit. Still further, the invention may be expressed as an authentication method, or an authentication program.

What is claimed is:

1. An authentication apparatus comprising a processor, wherein the processor is configured to:
   display, in a screen, an account field and a password field so as to allow an input;
   inhibit an input in the account field before an input is made in the password field;
   mask a letter inputted in the password field; and
   restrict a letter string including a same letter that has been inputted in the password field, from being inputted in the account field.

2. The authentication apparatus according to claim 1, wherein the processor inhibits a same letter as a first letter in the password field from being inputted in the account field, as a first letter.

3. The authentication apparatus according to claim 2, wherein the processor inhibits, when the same letter as the first letter in the password field is inputted in the account field as the first letter, an input of an additional letter in the account field, for a predetermined time.

4. The authentication apparatus according to claim 1, wherein, when a same letter as a first letter in the password field is inputted in the account field as a first letter, the processor displays the letter in the account field with a mask.

5. The authentication apparatus according to claim 1, wherein the processor inhibits an input in the account field through a keyboard before the password field is filled in, and permits an automatic input in the account field made without operating the keyboard, before the password field is filled in.

6. A non-volatile recording medium having an authentication program recorded thereon, the authentication program being configured to cause a computer including a screen to perform as:
   a display device that displays, in the screen, an account field and a password field so as to allow an input;
   an inhibition device that inhibits an input in the account field before an input is made in the password field;
   a masking device that masks a letter when the letter is inputted in the password field; and
   a restriction device that restricts a letter string including a same letter that has been inputted in the password field, from being inputted in the account field.

* * * * *